May 31, 1927.

R. FRYER

PUZZLE 1,630,530

Original Filed Sept. 15, 1924   2 Sheets-Sheet 1

Richard Fryer
INVENTOR

BY *Victor J. Evans*
ATTORNEY

WITNESS:

May 31, 1927.  R. FRYER  1,630,530

PUZZLE

Original Filed Sept. 15, 1924   2 Sheets-Sheet 2

Richard Fryer
INVENTOR

BY Victor J. Evans
ATTORNEY

WITNESS:

Patented May 31, 1927.

1,630,530

UNITED STATES PATENT OFFICE.

RICHARD FRYER, OF HUMBOLDT, SASKATCHEWAN, CANADA.

PUZZLE.

Application filed September 15, 1924, Serial No. 737,888. Renewed April 20, 1927.

This invention relates to puzzles and has application to that class of devices wherein a number of separable elements are employed and shaped to collectively define different geometrical figures.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
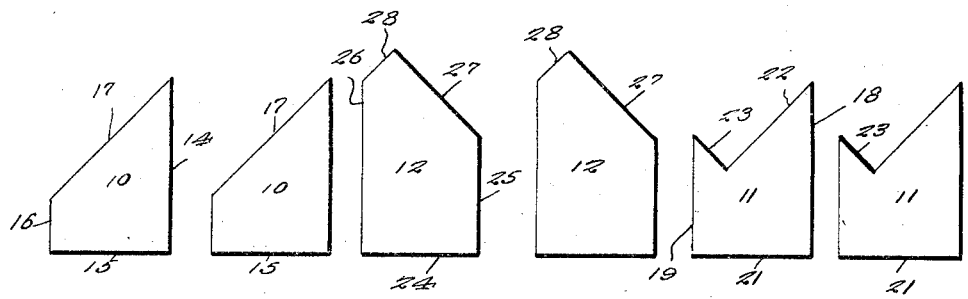
Figure 1 is a view of the component parts of the puzzle separated.

The puzzle essentially consists of six elements constructed as shown in Figure 1, wherein it will be noted that the elements are divided into three sets of two elements each. The elements of one set are indicated at 10, those of another set indicated at 11, while the elements of the third set are represented at 12.

The elements 10 of the first set are of substantially rectangular form, including one straight longitudinal edge 14, a straight transverse edge 15, a relatively short opposed longitudinal edge 16, and an obliquely disposed edge 17 which terminates in a line with the edge 14 defining a point.

The elements 11 of the second set are each provided with opposed straight longitudinal edges 18 and 19 respectively, the edge 18 being relatively long, while one end of each of these elements is substantially V-shaped with the sides 22 and 23 of the V of relatively different dimensions. The other end is straight as indicated at 21, the elements 21 of the third set are somewhat similar in shape to the elements 10 each including a straight edge 24 at one side, parallel side edges 25 and 26 of relatively different lengths which are connected by oppositely inclined edges defining a point at the opposite end of this element. The inclined edges 27 and 28 vary in length, the longer of said edges 27 extending from the short side of the element, while the short inclined edge 28 extends from the longer side 26.

Figure 2:
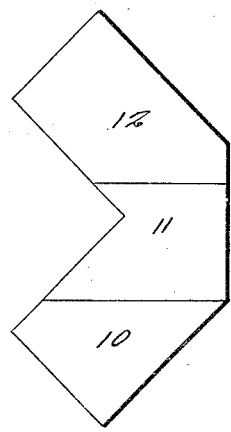
Figure 2 is a view showing certain of the elements associated to form half of a cross.
Figure 3:
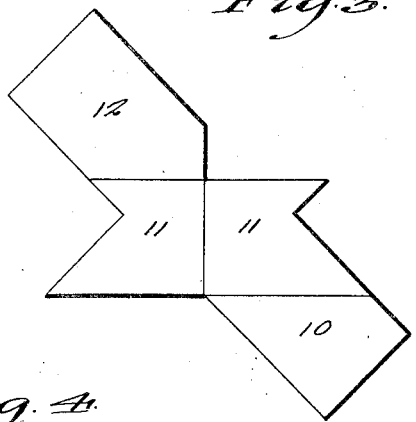
Figure 3 is a view showing other elements arranged in the partial formation of a cross.
Figure 4:
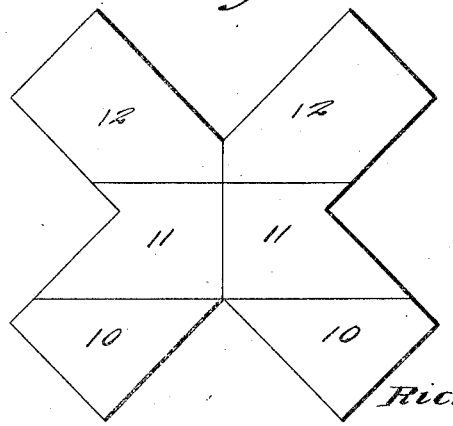
Figure 4 is a view showing all of the elements associated to form a cross.
Figure 5:
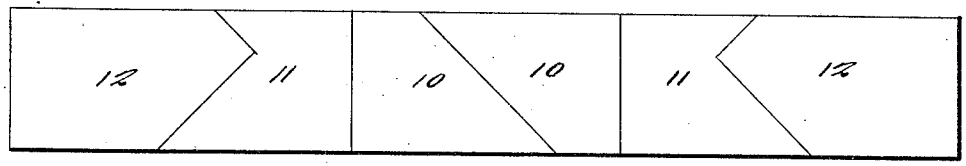
Figure 5 is a view showing the elements arranged in end to end relation in the formation of a straight bar.

These different sets of elements by reason of their configuration are susceptible of being associated in the formation of various geometrical figures such as shown in the drawings, and when associated to form a cross as illustrated in Figure 4, one element of each set is arranged in the manner shown in Figure 2, wherein it will be noted that the element 11 of one set is positioned between one of the elements of the other sets 10 and 12. The inclined edge 17 for the element 10 is arranged to contact the long straight edge 18 of the element 11, with the V-shaped extremity of this element 11 having its sides disposed in alignment with the short sides of the elements 10 and 12. The longest inclined edge 27 of the element 12 is arranged across the other straight side edge of the member 11, which brings the short inclined edge 28 of the element 12 in alignment with the straight edge 21 of the element 11. When the remaining three elements of the various sets are similarly arranged, they can be associated in the manner shown in Figure 4 in the formation of a cross. Then again, the cross can be formed by forming both sides of the cross at the same time, that is to say that the cross may be formed by arranging the elements as shown in Figure 3, which figure shows four of the six elements in a position for the purpose mentioned.

The various elements can be arranged in end to end relation to form a straight bar of elongated contour in plan, and this can be accomplished by arranging the bars in end to end relation in the following order, 12, 11, 10, 10, 11 and 12. In other words the pointed end of each element 12 is received by the V-shaped end of the adjacent element 11, the straight ends of which are arranged in contacting engagement with the straight ends of the elements 10, both of the latter mentioned elements being arranged centrally of the bar with their inclined edges 17 abutting.

Figure 6:
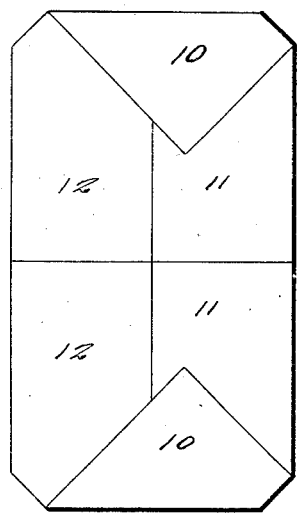
Figure 6 is a view showing the manner of associating the elements to form a parallelogram.

In Figure 6 I have shown how the elements can be used to form a parallelogram, wherein the elements 12 are arranged in end to end relation at one side of the figure with their inclined edges 17 terminating at a point in the longitudinal center of the figure, while the elements 11 are arranged in end to end relation with their V-shaped extremities outermost. The elements 10 are then arranged diagonally, so that the edge 14 of the uppermost element 10 will bear against the inclined edge 27 of the adjacent element 12, while the corner of the element 10 defined by the edges 14 and 15 is received by the U-shaped extremity of the adjacent element 11, thus disposing the short side edge 16 of the block 10 obliquely at the corners of the figure. The other element 10 is arranged in the lower end of the figure in exactly the same manner as illustrated in Figure 6.

Figure 7:
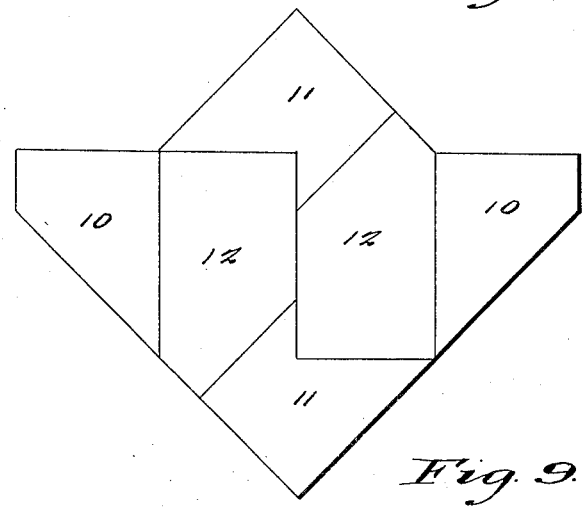
Figure 7 is a view showing the elements associated to form a substantially diamond shaped figure.
Figure 8:
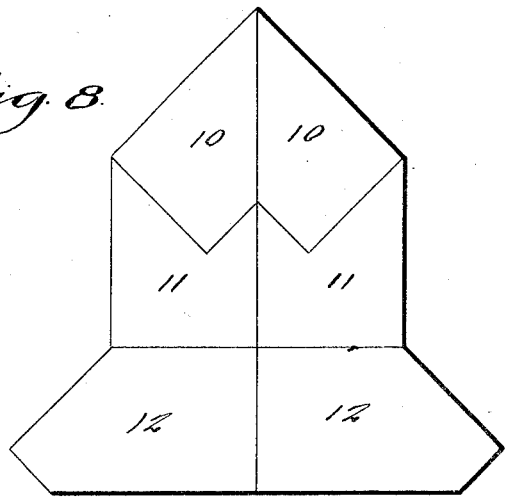
Figure 8 is a view of a figure of substantially pyramidal shape.

In Figure 7, the elements are arranged for forming a substantially diamond shaped figure by placing the elements in Figure 2 side by side with their pointed extremities extended in opposite directions. The elements 11 are arranged obliquely, so that the V-shaped extremities of these elements receive one corner of each element 12, in a manner whereby the short longitudinal edges of the element 11 contact the long inclined edges 27 of the elements 12. The straight ends of the elements 11 are thus arranged in alignment with the short inclined edges 28 of the elements 12, and it will be noted upon inspection of Figure 7 that the straight edge of one of the elements 11 is also arranged in alignment with the inclined edge 17 of one of the elements 10. These elements 10 are arranged at opposite sides of the figure with their straight edges arranged adjacent the straight edges of the elements 12, the inclined edge of the other element 10 is arranged in alignment with the long edge of the other element 11. In Figure 8, the elements are arranged to form a pyramid, including a base formed by the elements 12 having their straight end edges arranged in end to end relation. The straight ends of the elements 11 repose upon the corresponding short side edges 25 of the elements 12, while the elements 10 have their corresponding corners received by the V-shaped extremities of the elements 11, by placing the inclined edges 17 of the elements 10 in face to face contact.

Figure 9:
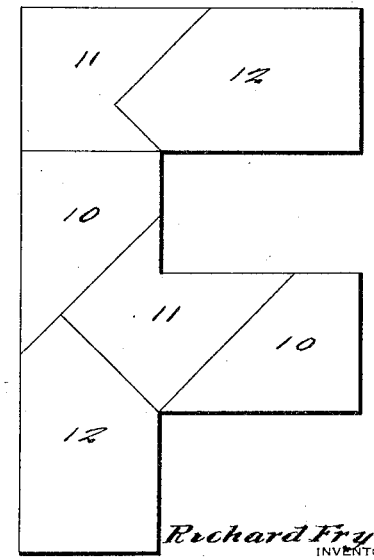
Figure 9 is a view showing the blocks arranged in the formation of the letter F.

In Figure 9, the elements are arranged to form the letter F, the body or long part being formed by one element of each set, with the element 10 arranged between the elements 11 and 12. The inclined edge of the element 10 contacts the short inclined edge 28 of the element 12, thereby bringing the long inclined edge 28 of this element 12 in relation to the inclined edge of the element 10 to form substantially a V-shaped nose to receive one corner of the other element 11. The other elements 10 and 12 are then associated with the elements 11 to form the parallel portions of the Figure 1.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A puzzle comprising three sets of two elements each, all of said elements being substantially of oblong contour in plan, and each element including three straight edges, the remaining edges of the elements of one set being inclined, opposed inclined surfaces of relatively different lengths formed on the elements of the second set, and the remaining edges of the elements of the third set having V-shaped notches with the side of the V of relatively different lengths, whereby all of said elements may be associated to form different geometrical figures.

2. A puzzle comprising three sets of two elements each, the elements of each set being identical, but different from the elements of the remaining sets, and designed to permit of their association in the formation of different geometrical figures, each element of one set having a straight end edge, opposed side edges of relatively different lengths and an inclined edge connecting said side edges, each element of the second set having a straight end edge, opposed side edges of relatively different lengths, and opposed inclined edges of relatively different length providing the element with a pointed end, and each element of the third set including a straight end edge, opposed side edges of relatively different lengths, and having a substantially V-shaped notch formed in the other end with the sides of the V of relatively different lengths.

In testimony whereof I affix my signature.

RICHARD FRYER.